2,727,015
POLYMERIC N,N'-ALKYLENEUREIDOALKYL ACRYLAMIDES AND PROCESS FOR PRODUCING THEM BY AMINOLYSIS

Robert W. Auten, Jenkintown, and Elinor M. Hankins, Philadelphia, Pa., assignors to Rohm & Haas Company, Philadelphia, Pa., a corporation of Delaware No Drawing. Application March 1, 1954,
Serial No. 413,422

12 Claims. (Cl. 260—72)

This invention deals with a process for aminolysing a polymer from an ester of acrylic acid and a monohydric alcohol, particularly a saturated alkanol, and with the products thus obtained.

Our process comprises forming a soluble polymer from such an acrylic ester, mixing the polymer and an N-aminoalkyl-N,N'-alkyleneurea, and heating the mixture under alkaline conditions. The aminolysis product may then be reacted with formaldehyde to form a methylol derivative. The aminolysis products and their methylol derivatives are useful for modifying cellulose in its various forms.

The starting polymeric products based on an acrylic ester may be homopolymers or copolymers which are formed preferably in solution in an organic solvent therefor. A primary requirement for the copolymers is that they contain a sufficient proportion of acrylic ester units which react with an N-aminoalkyl-N,N'-alkyleneurea to give the desired amide characteristics in the product.

As acrylic monomers for forming polymeric starting materials there are preferably used methyl acrylate, ethyl acrylate, propyl acrylate, isopropyl acrylate, or butyl, isobutyl, or sec-butyl acrylates. Polymers of methyl acrylate and many copolymers having units from methyl acrylate react with aminoalkylalkyleneureas in the presence of an excess of the latter, the alkalinity therefrom being sufficient to promote the reaction. The reaction here may also be promoted with more strongly alkaline reagents, in particular the alkali metal alkoxides. The rate of reaction is then increased, as also the extent of aminolysis in a given time. These alkaline catalysts appear particularly helpful for aminolysis of polymers from esters above methyl acrylate.

Polymers of esters of acrylic acid and alcohols above butyl may also be used, but then the aminolysis products tend to remain organic solvent-soluble rather than become water-soluble. Such aminolysis products are of primary interest in coatings.

Alkyl acrylates may also be used in forming copolymers. For example, mixtures of alkyl acrylates may be copolymerized in solvent solution. Again, an alkyl acrylate may be mixed with one or more other polymerizable monovinylidene compounds and a copolymer formed from the mixture. Such compound may be an acrylate with functional groups other than the ester linkage, including dimethylaminopropyl, dimethylaminoethyl, tert-octylaminoethyl, ethoxyethyl, or butoxyethyl acrylates, or ethoxypropyl, or a methacrylate such as methyl methacrylate, ethyl methacrylate, propyl methacrylate, butyl methacrylate, ethoxyethyl methacrylate, dimethylaminopropyl methacrylate, or other methacrylic ester of a monohydric saturated alcohol; an itaconate such as dimethyl itaconate or diethyl itaconate; an amide such as acrylamide, methacrylamide, N-ethylacrylamide, N-phenylacrylamide, N-dimethylaminopropylacrylamide, N-methylmethacrylamide, etc.; a hydrocarbon such as styrene or vinyltoluene; a vinyl ester such as vinyl acetate or propionate; a vinyl ether such as vinyl butyl ether, vinyl ethoxyethyl ether, or vinyl octyl ether; and, even though rates of polymerization thereof are less favorable, such substances as dimethyl maleate, allyl acetate, allyl alkyl ethers, and olefinic hydrocarbons, such as ethylene and butadiene. Copolymers should contain at least 20 mole per cent of units from an alkyl acrylate. There is, of course, no fixed upper limit for the proportion of alkyl acrylate.

The polymer or copolymer is best formed in solvent solution. Useful solvents include hydrocarbons, such as benzene, toluene, xylene, and methylated naphthalenes, esters, such as ethyl acetate or butyl acetate, amides such as formamide or N-methylformamide, ethers such as isopropyl ether, chlorinated solvents, and the like. If the solvent is one which can interfere as by reacting with the N-aminoalkyl-N,N'-alkyleneurea, as in the case of the esters, such solvent is removed from the polymeric starting material before it is reacted with the urea.

Methods of forming polymers and copolymers are known to the art. Use of free radical initiators is common. For example, a solution of an alkyl acrylate can be made in toluene, 30% to 75% of acrylate being conveniently so used. A peroxide, such as benzoyl peroxide or tert-butyl perbenzoate, is added in an amount of 0.001% to about 2% of the weight of monomer. The solution is heated at 85° to 110° C. until a high degree of polymerization has been reached. Polymers having molecular weights from about 1000 up to 300,000 or more can thus be readily formed, as is known. Polymer sizes may be defined by viscosities of solutions, a range of A at 50% to $Z_5$ at 20% in toluene at 25° C. on the Gardner-Holdt scale being preferred. If desired, solvent can be taken off at this point or a reactive solvent, such as an ester, may be replaced with an inert solvent. Solvent may also be driven off during the heating of the mixture of polymer and N-aminoalkyl-N,N'-alkyleneurea. In another way of operating solvent may be retained in the reaction mixture. Water is finally added to take up water-soluble reaction products and a separation thus achieved. Instead of a peroxidic initiator there may be used one of the azo compounds known to act as a free radical catalyst, such as azodiisobutyronitrile or dimethyl azodiisobutyrate.

As N-aminoalkyl-N,N'-alkyleneurea there may be used a compound of the structure

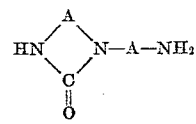

where A is an alkylene chain of two to three carbon atoms. Of particular importance are N-aminoethyl-N,N'-ethyleneurea or 1-β-aminoethyl-2-imidazolidone and 1-aminopropyl-2-hexahydropyrimidone.

One or more of the ureas of the above formula is mixed with the polymer. The ratio of urea to acrylate unit can vary from 0.5/1 to 5/1 on a molar basis. The minimum ratio is fixed by the amount required to give the necessary degree of aminolysis to ensure a product of proper solubility and other properties. Excess of a said urea merely dilutes the reaction product. Any free urea may be removed, if so desired, on separation and/or purification of the reaction product.

Polymer and a said urea are reacted by heating. The presence of a catalyst greatly accelerates the reaction. Excess of a said urea serves as catalyst when methyl acrylate is used as a mer. Here nevertheless, and in the case of polymers built on other acrylic esters there may be used such solvent soluble alkaline agents, as sodium or potassium methoxide, ethoxide, propoxide or butoxide, or a quaternary ammonium hydroxide or alkoxide, such as trimethylbenzyl ammonium, dimethyldibenzyl ammonium, or trimethylhydroxyethyl ammonium hydroxide or trimethylbenzyl ammonium butoxide. Alkali metal dispersions also act as catalysts. An amount of 0.25% to 10% of catalyst on the weight of the polymer is suitable. The catalyst is desirably used in an organic solvent which is inert to the catalyst. For example, sodium methylate is conveniently used as a 10% to 25% solution in methanol. The solvent thus added can also be used for refluxing when the mixture is heated.

Aminolysis is conducted at temperatures between 65° and 130° C., best from 75° to 120° C. Heating is continued until a product of desired properties is reached. The extent of aminolysis can be followed through consumption of a said urea as shown by titration. Within broad limits 10% to 90% of the acrylate units are reacted with a said urea. Preferably aminolysis is continued until about 30% to about 65% of the acrylate units have reacted.

During the reaction some acrylic ester groups are converted into amide groups. Some ester groups remain. Some ester groups are saponified. Thus there are formed sodium or potassium carboxylate groups or amine salts. The nature of the products obtained is clearly dependent upon the presence of all of these—and, perhaps, other groups—for polymers having exclusively one of the functional groups fail to function in the same way as the products of this invention.

The products obtained as described are useful for modifying cellulose in the form of fibers, filaments, or fabrics. They are useful as additives for cellulose acetate to modify dyeing properties, for example, or to prevent gas fading. They improve the wet strength of paper. They can be used as sizes or as components of sizing baths for treating yarns and fabrics.

The aminolysis products may also be reacted with formaldehyde, in the form of gas, or aqueous or alcoholic solutions, or revertible polymers, to give methylol compounds. From one half mole of formaldehyde to five moles of formaldehyde may be used per amide group. Reaction is best accomplished in aqueous solution between pH's of 8 and 10. Unreacted formaldehyde in the resulting reaction product is not objectionable. In fact it serves to stabilize the methylol product. The methylol product or products are useful for improving the wet strength of paper. They may be added at the beater. Papers formed from the thus treated pulps rapidly develop wet strength at a remarkably high level. Furthermore, these products are effective at relatively high pH values. For instance, exceptional wet strength is developed in paper formed at a pH of 5 or 6.

If it is desired to purify the product of aminolysis, this may be done after the reaction mixture of polymer and N-aminoalkyl-N,N'-alkyleneurea has been heated for the needed time, times of one to 140 hours having been used and found satisfactory in different situations. The aminolysis product may, for example, be treated with acetone to remove unreacted N-aminoalkyl-N,N'-alkyleneurea. Again, the product may be taken up with water, insoluble material filtered off, and the product precipitated upon addition of acetone.

The following examples are presented to illustrate preferred methods for preparing the products of this invention. Parts shown are by weight unless otherwise designated.

Example 1

(a) A solution is prepared from 4.3 parts of benzoyl peroxide and 430 parts of freshly distilled methyl acrylate. This solution is added in small increments over a six hour period to 645 parts of toluene which is maintained at refluxing temperatures. The mixture is well agitated. After all of the methyl acrylate has been added, the mixture is heated at 103° C. for three hours. A portion of 150 parts of toluene is added. The mixture is then heated to distill off toluene and unpolymerized methyl acrylate until the overhead temperature reaches 111° C. There results a solution of polymer having a Gardner-Holdt viscosity of C and containing 45% solids. The yield of polymer is 97%–98%.

(b) A portion of the above polymer is heated with evolution of a small amount of toluene to bring the polymer content to 47.5%. There are mixed 59.6 parts of this polymer solution, 116.1 parts of N-aminoethyl-N,N'-ethyleneurea, 55.6 parts of ethylene glycol, and 4 parts of a 25% solution of sodium methoxide in methanol. This mixture is stirred and heated with gradual taking off of distillate. The pot temperature advances from 103° to 121° C. over a period of 5.5 hours. During this time three additions are made of two parts each of catalyst solution. The reaction mixture is then cooled and treated with about 700 parts of acetone. Polymeric material is thus precipitated. The acetone layer is taken off. The polymeric material is dissolved in water and reprecipitated by adding acetone. The precipitated material is separated and dried at 60° C. at 0.5 mm. pressure to give 34 parts of a brittle tan solid. This is a polymer which contains ester groups, ureidoethylamide groups, and sodium carboxylate groups. The following analytical values help characterize this product, nitrogen, 10.1%; methoxyl groups, 5.49%; sodium, 2.3%; titratable nitrogen, 1.3%.

This product is useful as a size for synthetic fibers, filaments, and fabrics, being applied thereto from water-solutions by dipping, padding, or like treatment. It is also useful as an additive in paper making to improve wet strength.

Example 2

(a) There are mixed 80.7 parts of a toluene solution containing 32% of polymer of methyl acrylate, formed under the influence of 1% of benzoyl peroxide from commercial inhibited methyl acrylate, this polymer giving a Gardner-Holdt viscosity of W at 50% in toluene, 116.1 parts of N-aminoethyl-N,N'-ethyleneurea, 180 parts of anhydrous methanol, and one part of metallic sodium. The mixture is stirred and heated with refluxing for 159 hours, there being added from time to time three one part portions of sodium. Toluene and methanol are distilled off under reduced pressure at 60° C. to yield 234 parts of a reddish brown viscous liquid. This is poured into 1000 parts of acetone. The mixture is filtered. More acetone is added to the filtrate with further precipitation. This solid is added to the original filter cake, which is then dissolved in 75 parts of water. To the solution acetone is added with precipitation of product. The solid is filtered off, redissolved in water, and reprecipitated with acetone. The final precipitate is dried at 60° C./0.5 mm. and is a brittle tan solid. It contains 52.38% of carbon, 5.88% of hydrogen, and 18.5% of nitrogen. It contains 8.8% of titratable nitrogen and 1.64% of sodium. If this product were entirely a polyamide, it would contain 22.45% of nitrogen and 52.44% of carbon.

(b) A solution of 34.1 parts of the above aminolysis product is prepared in 150 parts of water. This solution is gradually added over a 20 minute period to 62.5 parts of aqueous 36% formaldehyde solution which has been adjusted to a pH of 8.8 and diluted with 100 parts of water. Additional aqueous 50% sodium hydroxide solution is added to maintain the pH above 8.5. The mixture is heated to about 75° C. for 90 minutes and diluted to a total weight of 386 parts, at which time the solids content is 10%.

This product added to paper pulp at 1 to 3% of the dry weight thereof gives exceptional high wet strength papers.

The procedures described above are followed with substitution of choline for sodium as catalyst and continuation of the aminolysis reaction for 163 hours. In this case the aminolysis product by analysis contains 53.3% of amide groups and 19% of ester groups. Conversion of this product to the methylol derivative is readily accomplished by the above procedure.

Example 3

There are mixed 50.5 parts of a 51.2% solution of methyl polyacrylate in toluene, prepared with 0.9% of benzyl peroxide, 116.1 parts of N-aminoethyl-N,N'-ethyleneurea, 32 parts of methanol, and 12 parts of a methanolic 25% sodium methoxide solution. The mixture is placed in a stainless steel autoclave and agitated therein for 25 hours at 99°–102° C. The charge is cooled and transferred to a still, where methanol and toluene are stripped off at reduced pressures. The residue of 138 parts is treated with acetone. The acetone layer is taken off and the acetone-insoluble material is dissolved in a minimum amount of water. This solution is treated with acetone to reprecipitate the product, which is separated and dried at 60° C./0.5 mm. to give 53.3 parts of a brittle tan solid. This product contains 21.3% of nitrogen, 4% of titratable nitrogen, and 2.1% of sodium, and has a methoxyl content of about 1%.

Substitution of polymer of ethyl acrylate for the above methyl acrylate polymer leads to a product closely similar with the above. In the same way other alkyl acrylates may be polymerized and subjected to aminolysis with similar outcome.

Example 4

There are mixed 40.7 parts of a 63.5% solution of polymerized methyl acrylate in toluene (prepared with 0.5% of benzoyl peroxide at reflux temperatures) and 38.7 parts of N-aminoethyl-N,N'-ethyleneurea. The mixture is stirred and heated under reduced pressure with distillation of solvent to a constant weight of 63.2 parts. During this stripping operation addition is made of a little toluene and methanol to facilitate stirring and mixing. This residue is transferred to an autoclave and treated with 12 parts of dry methanol and 15 parts of methanolic 25% sodium methoxide solution. The autoclave is sealed and the contents agitated and heated at 89°–110° C. for 25 hours. The charge is transferred with the aid of methanol to a still, where it is heated on a steam bath at reduced pressure to drive off the methanol. The residue is dissolved in water and polymer is precipitate with acetone. The precipitate is collected and dried at 60° C./0.5 mm. to give 46 parts of a brittle tan solid polymer. It contains 19.1% of nitrogen, 2.3% of titratable nitrogen, and 2.4% of sodium. It has a methoxyl content of 1.5%.

In the same way polymers of ethyl acrylate, propyl acrylate, or butyl acrylate can be treated with essentially similar end-products resulting.

Example 5

A mixture of 50.5 parts of a 51.2% solution of polymerized methyl acrylate in toluene (prepared with 1.1% of benzoyl peroxide) and 141.5 parts of 1-(3-aminopropyl) hexahydro-2-pyrimidone was stirred and stripped under reduced pressure to remove toluene. The residue is transferred to an autoclave with the aid of a little methanol and treated with 15 parts of methanolic 25% sodium methoxide solution. The autoclave is sealed. The contents are agitated and heated at 95°–102° C. for 24 hours. The reaction mixture is cooled and transferred to a still where it is stripped of methanol. Polymeric product is treated with acetone. The insoluble material is dissolved in water and precipitated with acetone. The precipitate is separated and dried at 60° C./0.5 mm. The product is in large part an amide as shown by a nitrogen content of 17.4%. (If the aminolysis had been complete nitrogen content would be 19.9%.) Titratable nitrogen is 3.9% and sodium content is 2.68%. The methoxyl content is 1.5%. This product is useful as an additive to cellulose acetate. It also improves the wet strength of paper.

A solution of 7.26 parts of this product in 40 parts of water is gradually added to a solution of 12.4 parts of 36.3% formalin solution in 40 parts of water which has been adjusted to a pH of 9.0 with caustic soda solution. The final mixture is adjusted with caustic soda solution to pH 8.5 and heated at 65° C. for two hours. The resulting product is the methylol derivative of the above aminolysis product. It is useful in improving the wet strength of paper. For example, addition of 1% of the methylol product to unbleached kraft pulp, which was then treated with alum to pH 4, gave a paper with a wet tensile strength (lbs./in.) of 4.9 at one day, 5.6 after 7 days, and 6.1 after 28 days. Strength for a control was about 0.4 lb./in.

An aqueous solution of the aminolysis product may be passed over a cation-exchange resin in hydrogen form. The sodium ions are exchanged for hydrogen ions. In a typical product thus treated it was found by analysis that 60% of the functional groups were amide groups, 16% were ester groups and 24% were carboxyl groups. This material is a useful warp sizing agent, particularly for synthetic yarns.

Example 6

(a) Twenty weight per cent of a solution containing 361 parts of uninhibited methyl acrylate, 180 parts of uninhibited methyl methacrylate, 541 parts of toluene, and 2.7 parts of benzoyl peroxide was heated with stirring at 85°–95° C. for one hour, during which time polymerization occurred. The remaining solution was added dropwise with stirring at 92°–100° C. in a period of three and one-third hours. The temperature was kept in this range by regulation of the rate of addition and of heating. The reaction mixture was heated at 98° C. for one and one-half hours. The product consisted of 1074 parts of a colorless solution with 49.7% solids and Y— viscosity on the Gardner-Holdt scale. The conversion of monomers to copolymers was 99%.

(b) A mixture of 45.2 parts of N-aminoethyl-N,N'-ethyleneurea and 90.8 parts of a 49.7% solution in toluene of the methyl acrylate-methyl methacrylate copolymer prepared as described above was heated at 23–33 mm. to remove 28.9 parts of solvent. To the residue was added 22 parts of methanol and 16.8 parts of 25% methanolic sodium methoxide. The reaction mixture was refluxed for twenty hours; titration indicated that 89% of the amine in the charge had reacted. There was obtained 131.6 parts of a light brown liquid with a solids content of 58.2% and a Gardner-Holdt viscosity of B at 35% solids in water. Characterization of this product indicated that the copolymer consisted of 56.5 mole per cent amide, 6.3 mole per cent carboxylate, and 37.3 mole per cent ester.

To a solution of 29.0 parts of the above aminolysis product in 65 parts of water was added 27.8 parts of 37% aqueous formaldehyde at pH 9.0. The resultant solution was heated one-half hour at 60°–65° C. The product, with a Gardner-Holdt viscosity of A—3, imparted wet strength to paper.

In the aminolysis of the polymers or copolymers based on alkyl acrylates with an N-aminoalkyl-N,N'-alkyleneurea there may be used as supplemental reactants small proportions of other reactive amines, i. e. amines having hydrogen on the nitrogen thereof. This variation is illustrated in the following example.

Example 7

To a solution containing 346.5 parts of a 74.5% solution of methyl polyacrylate in toluene (prepared with 1.5% of benzoyl peroxide by weight on methyl acrylate inhibited with 0.15% monomethyl ether of hydroquinone), 30.6 parts of γ-dimethylaminopropylamine, and 66.0 parts of methanol was added at 50° C. 100.5 parts of 25% methanolic sodium methoxide. The reaction mixture was refluxed for four hours to give 539.5 parts of a copolymer solution; the copolymer contained 8.5 mole per cent amide and 91.5 mole per cent ester.

To 476.0 parts of the above solution was added 239.0 parts of N-aminoethyl-N,N'-ethyleneurea and 58.3 parts of methanol. The resulting solution was refluxed for seventeen hours. The product consisted of 763.5 parts of a light brown viscous liquid with 56.0% total solids. Characterization of the copolymer thus formed indicated 55.5 mole per cent amide from N-aminoethyl-N,N'-ethyleneurea, 8.5 mole per cent amide from dimethylaminopropylamine, 5.2 mole per cent carboxylate, and 30.8 mole per cent ester. It was possible to quaternize the polymeric product with methyl iodide.

A methylol derivative was prepared at pH 9.4 from 30.2 parts of the copolymer solution prepared as described above, 27.8 parts of 37% aqueous formaldehyde, and 63.8 parts of water. The resultant product (121 parts) contained 14% resin solids and had a Gardner-Holdt viscosity of A—.

In this example dimethylaminopropylamine is used to form a small proportion of amide groups and N-aminoethyl-N,N'-ethyleneurea is reacted to carry amidization further. In general up to about 20–25% of the amide groups may be formed from the first amine under the same conditions as have been described for the above-described aminolysis with an N-aminoalkyl-N,N'-alkyleneurea and the total aminolysis carried to as much as 90% of the total carboxylic groups. In place of dimethylaminopropylamine there may be used other dialkylaminoalkylamines, typical of which are diethylaminopropylamine, dibutylaminopropylamine, morpholinopropylamine, piperidinopropylamine, pyrrolidinopropylamine, dimethylaminoethylamine, dibutylaminoethylamine, or morpholinoethylamine. The amines having both primary amine and tertiary amine groups are useful for imparting basicity to the complex products resulting from aminolysis. Since these have a definitely cationic nature, they are useful in treating cellulose in the form of battings, knitted and woven textiles, paper, and the like. Interesting finishes are imparted to cotton and rayon fabrics, for example. Paper can be thus improved in its various strength characteristics.

We claim:

1. A process which comprises mixing a soluble polymer of a lower alkyl acrylate and an aminoalkylalkyleneurea of the structure

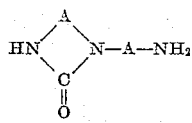

where A is an alkylene group of two to three carbon atoms, and heating the resulting mixture between 65° and 130° C. under alkaline conditions with formation of amide groups in the polymer.

2. The product of the process of claim 1.

3. A process which comprises mixing a polymer of a lower alkyl acrylate with at least an equivalent proportion of an aminoalkylalkyleneurea of the structure

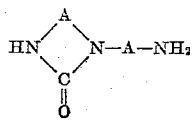

where A is an alkylene group of two to three carbon atoms, and heating the resulting mixture between 75° and 120° C. in the presence of an alkali metal alkoxide as catalyst with formation of amide groups in the polymer.

4. The process of claim 2 in which the alkyl acrylate is methyl acrylate.

5. The product of the process of claim 4.

6. A process which comprises mixing a polymer of a lower alkyl acrylate with at least an equivalent proportion of an aminoalkylalkyleneurea of the structure

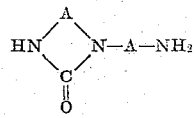

where A is an alkylene group of two to three carbon atoms, heating the resulting mixture between 65° and 130° C. under alkaline conditions to form amide groups in the polymer, and reacting the amide group-containing product with formaldehyde in aqueous solution between pH's of 8 and 10.

7. The product of the process of claim 6.

8. A process which comprises mixing a polymer of methyl acrylate and N-aminoethyl-N,N'-ethyleneurea, and heating the resulting mixture in the presence of a sodium alkoxide as catalyst between 75° and 120° C. with formation of amide groups in the polymer.

9. The product of the process of claim 8.

10. A process which comprises mixing a polymer of methyl acrylate and 1-(3-aminopropyl)hexahydro-2-pyrimidone, and heating the resulting mixture in the presence of sodium methoxide as catalyst between 75° and 120° C. with formation of amide groups in the polymer.

11. The product of the process of claim 10.

12. A process which comprises reacting by heating together a polymer of a lower alkyl acrylate and an aminoalkylamine in a proportion of not over 0.25 mole of said amine per mole of said lower alkyl acrylate in the polymer, said aminoalkylamine having at least one hydrogen on the nitrogen of one of its amino groups and having a tertiary nitrogen atom in another of its amino groups, and reacting the resulting product with an aminoalkylalkyleneurea of the structure

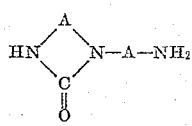

where A is an alkylene group of two to three carbon atoms by heating said product with said aminoalkylalkyleneurea between 65° and 130° C. under alkaline conditions.

References Cited in the file of this patent

UNITED STATES PATENTS

| | | |
|---|---|---|
| 2,146,209 | Graves | Feb. 7, 1939 |
| 2,312,863 | Bestian | Mar. 2, 1943 |
| 2,558,139 | Knock | June 26, 1951 |